United States Patent
Jacobson

[11] 3,958,456
[45] May 25, 1976

[54] FORCE TRANSDUCER

[75] Inventor: Walter E. Jacobson, Meriden, Conn.

[73] Assignee: Revere Corporation of America, Wallingford, Conn.

[22] Filed: Aug. 6, 1975

[21] Appl. No.: 602,326

[52] U.S. Cl. .................................. 73/141 A; 338/5
[51] Int. Cl.² ........................................... G01L 1/22
[58] Field of Search ...................... 73/141 A; 338/5

[56] References Cited
UNITED STATES PATENTS

| | | | |
|---|---|---|---|
| 3,037,178 | 5/1962 | Pien | 73/141 A X |
| 3,365,689 | 1/1968 | Kutsay | 73/141 A X |
| 3,565,196 | 2/1971 | Laimins | 73/141 A X |
| 3,869,906 | 3/1975 | Andersson | 73/141 A |

*Primary Examiner*—Charles A. Ruehl
*Attorney, Agent, or Firm*—Cooper, Dunham, Clark, Griffin & Moran

[57] ABSTRACT

This force transducer is intended for use in locations where the space available is dimensionally limited in the direction of the active and reactive forces being measured. It is more resistive to forces acting at an angle with respect to those active and reactive forces than the devices of the prior art. It comprises a cylindrical block, usually steel, having a central load bearing portion adapted at one end to oppose a force acting axially of the block, and a peripheral portion concentric with the central portion and adapted at the opposite end to oppose the reactive force. The central portion and the peripheral portion are separated by two arrays of cylindrical holes, with at least three holes in each array, each hole extending parallel to the axis of the block and spaced therefrom. The two arrays of holes define at least three pairs of parallel bridging portions extending between the central load bearing portion and the peripheral load bearing portion. Two strain sensitive elements are mounted on each bridging portion on opposite surfaces thereof, so that two strain sensitive elements are located inside each hole. The strain sensitive elements are connected in a bridge circuit. Two span temperature compensating resistance elements are located in two of the holes, and are connected in series with the bridge circuit.

9 Claims, 12 Drawing Figures

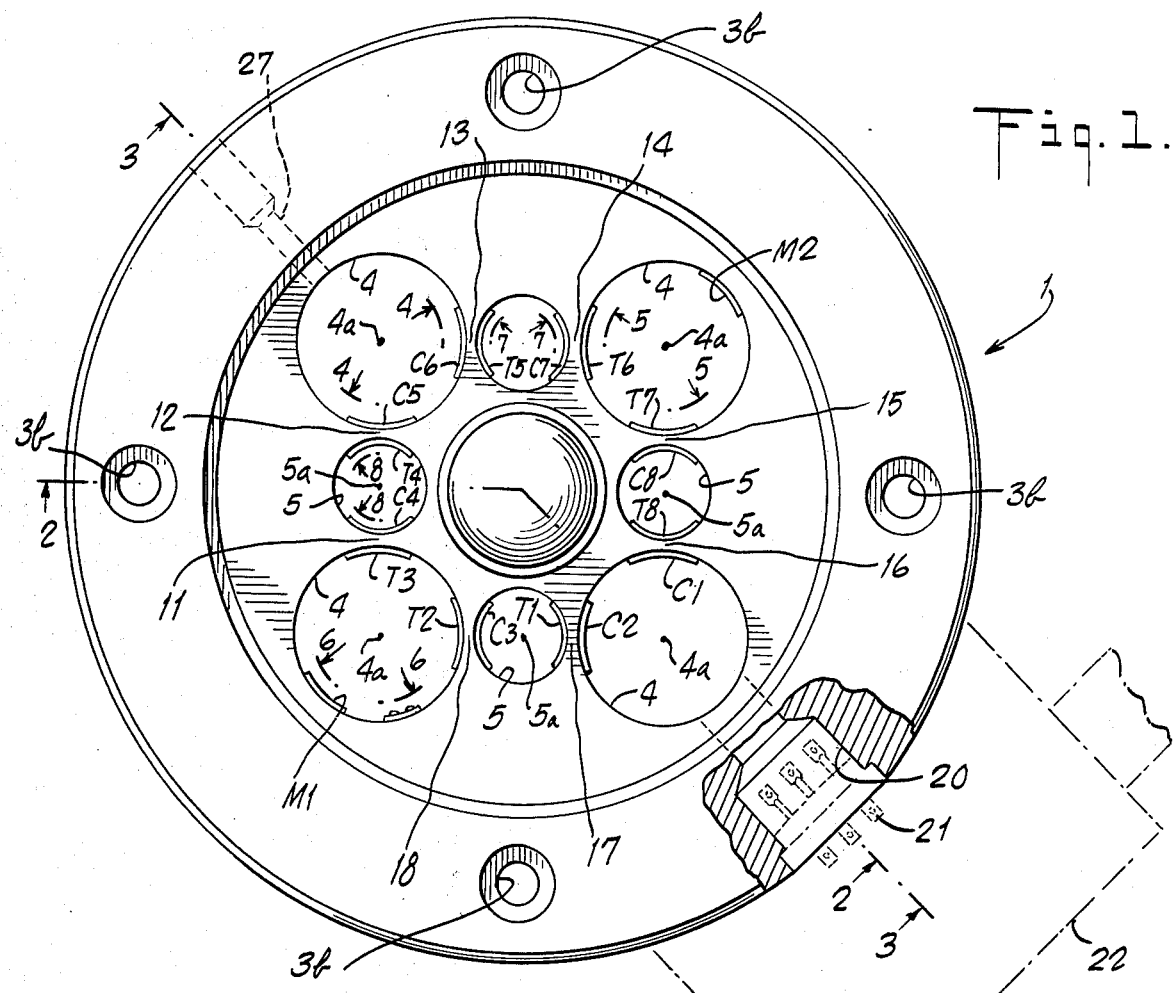
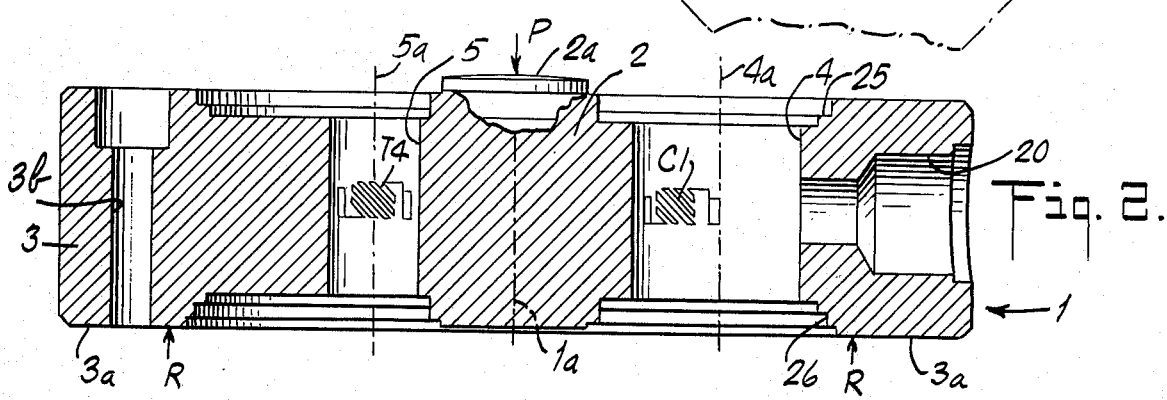
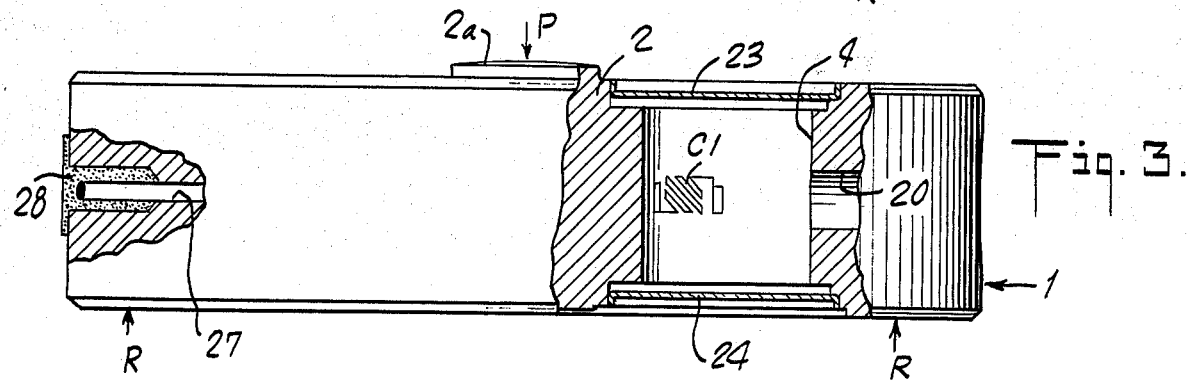

FORCE TRANSDUCER

BACKGROUND OF THE INVENTION

Ruge, U.S. Pat. No. 2,597,751, (FIG. 11) suggests a load cell having "two or more load-weighing legs" connecting a central load-carrying member to a peripheral member, with electrical strain gages provided inside apertures in the legs.

Pien, U.S. Pat. No. 3,037,178, shows a similar load cell with radial legs connecting a central load receiving portion to an outer load supporting portion. The legs are separated by apertures in the configuration of two overlapping cylindrical holes.

BREIF SUMMARY OF THE INVENTION

The force transducer of the present invention comprises a cylindrical block of elastic material having a diameter greater than its axial length, with two arrays of cylindrical holes extending parallel to the axis of the block and spaced from that axis. The axes of the holes in one of the arrays intersect a plane perpendicular to the block axis at the corners of an $n$-sided polygon whose center is at the intersection of the block axis with that plane. The axes of the holes in the other array intersect the plane at midpoints of the side of that $n$-sided polygon.

The arrays of holes separate a central load carrying portion of the block, located between the holes and the block axis, from a peripheral load carrying portion, located outside the holes. The two arrays of holes define axially extending surfaces of $n$ pairs of parallel bridging portions extending between the load carrying portions. A plurality of strain sensitive elements, typically electrical resistance elements, are mounted on the axial surfaces of the bridging portions.

The bridging portions of each pair are equally spaced from and parallel to the plane containing the axis of the cylindrical block. Thus, there are $n$ such planes, respectively parallel to the $n$ pairs of bridging portions, and equally angularly spaced about the axis of the block.

In the preferred embodiment, the holes of the first array have a substantially greater diameter than the holes of the second array.

The strain sensitive electrical resistance elements are arranged with their conductors extending diagonally with respect to the axis of the block. Furthermore, the strain sensitive element on one side of each bridging portion has its conductors extending in planes substantially perpendicular to the conductors of the strain sensitive element on the opposite side. The strain sensitive elements are thus stressed in shear and measure shear strains.

The strain sensitive elements are connected in a bridge circuit. Two span temperature compensating resistance elements are connected in series with the input terminals of the bridge circuit and are located inside two of the holes at localities spaced from the bridging portions.

The present invention is improved with respect to the load cells disclosed by Ruge and Pien in that the resistance of the force transducer to diagonally or laterally directed forces is greater than in the prior art devices. Furthermore, the beams of a parallel pair have thinner cross-sections than a single beam of the same capacity. Consequently, the strain sensitive elements of the present invention are closer to each other and follow temperature changes more rapidly and more nearly in unison than in the prior art transducers, thereby enhancing temperature compensation. This enhancement is particularly effective during temperature changes either transient changes or changes of longer duration, which result in the establishment of temperature gradients.

The strain sensitive elements are connected in a bridge circuit. Two modulus compensating resistance elements are connected in series with the input terminals of the bridge circuit and are located inside two of the holes at localities spaced from the bridging portions. These elements are temperature sensitive resistance elements with their wires extending in planes substantially perpendicular to the axis of the block.

DRAWINGS

FIG. 1 is a plan view of a force transducer embodying the invention.

FIG. 2 is a sectional view taken on the line 2—2 of FIG. 1.

FIG. 3 is a view, partly in elevation and partly in section on the line 3—3 of FIG. 1, with annular cover elements added.

FIGS. 5, 6, 7 and 8 are similarly developed elevational views taken on the lines 5—5, 6—6, 7—7 and 8—8 respectively of FIG. 1.

Figure 9:
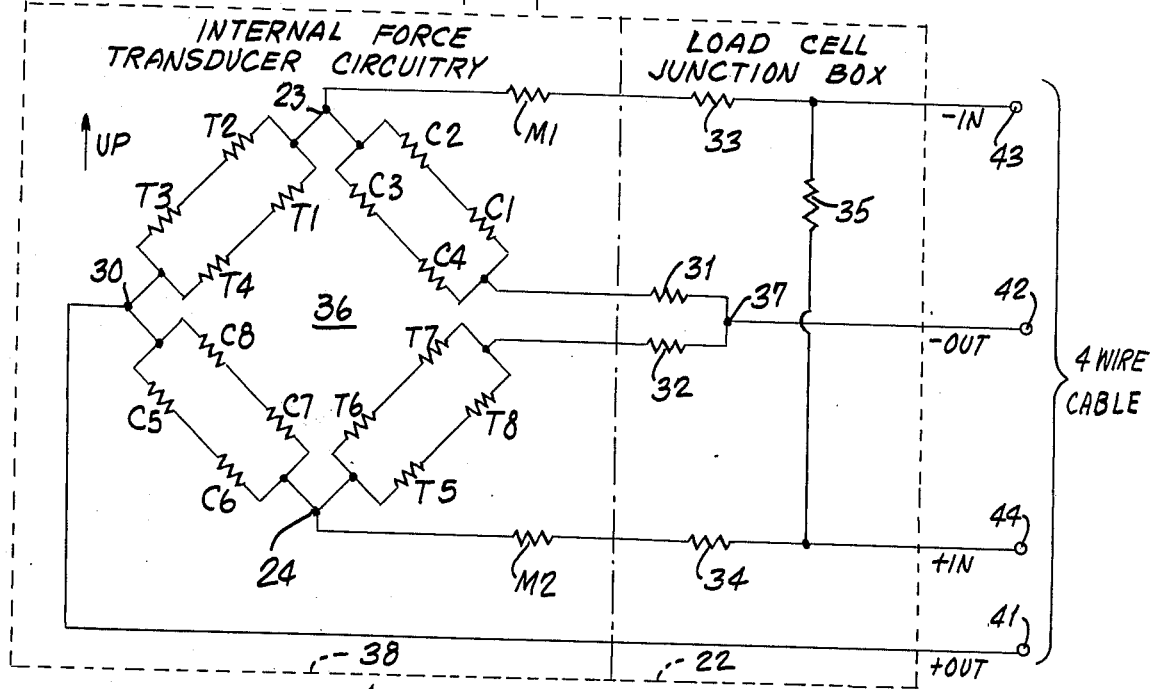

FIG. 9 is a wiring diagram showing the connections for the strain sensitive elements of FIG. 1.

Figure 10:
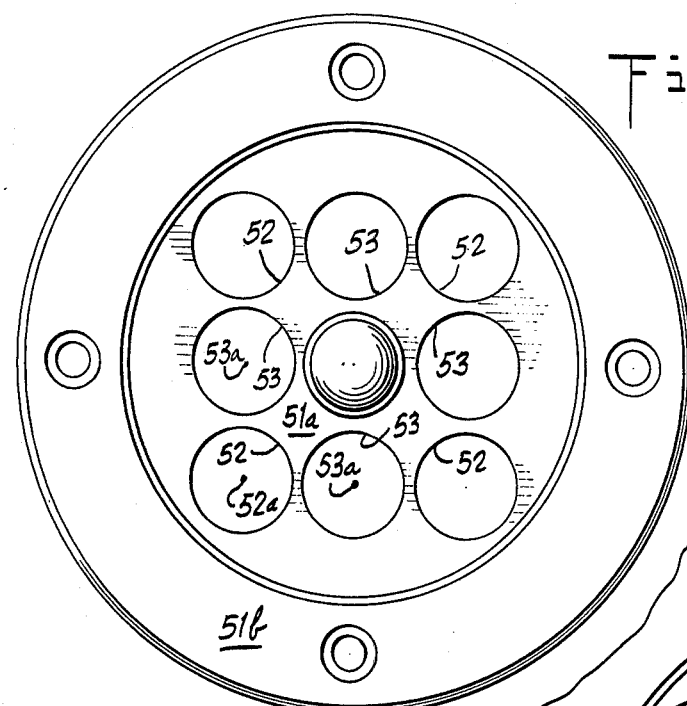

FIG. 10 is a plan view similar to FIG. 1, illustrating a modification.

Figure 11:
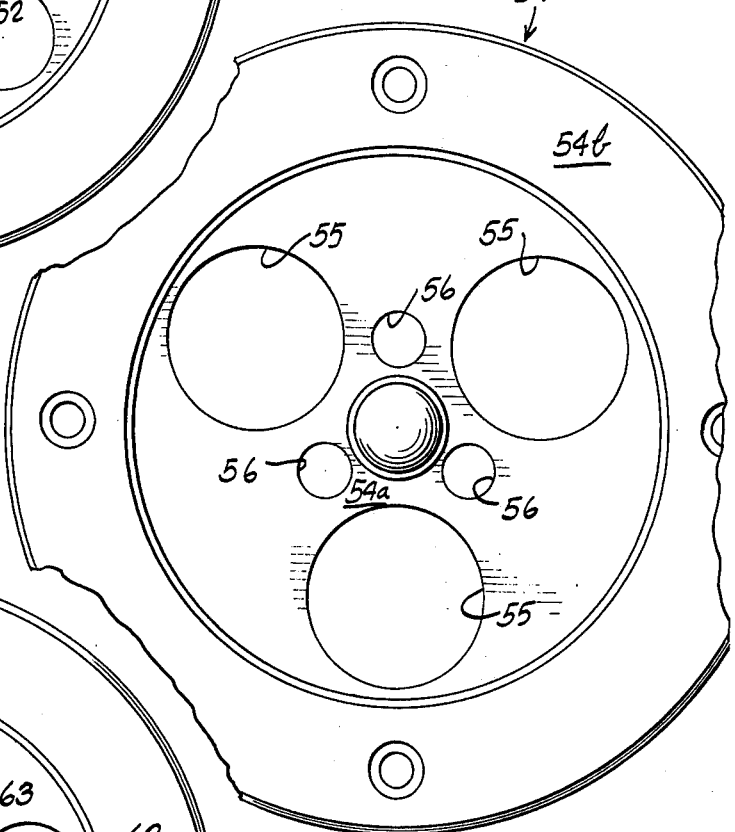
Figure 12:
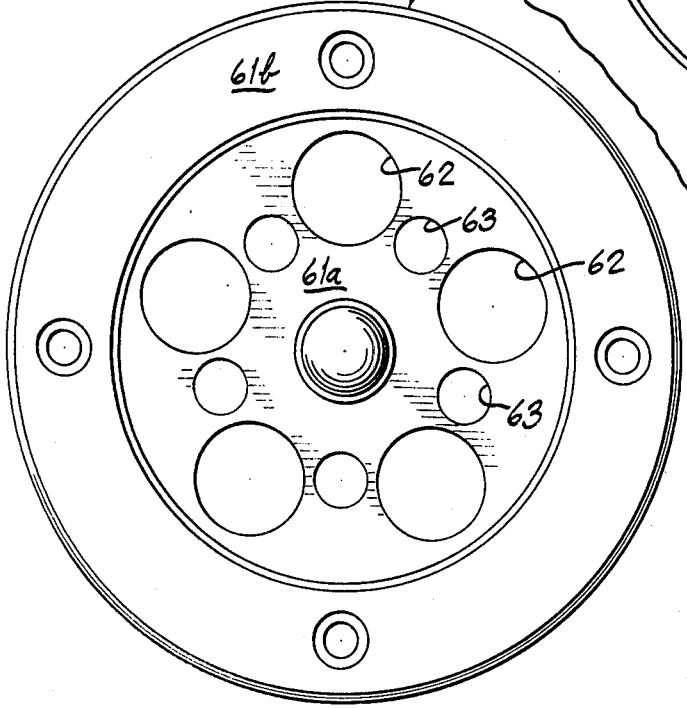

FIGS. 11 and 12 are similar plan views illustrating still further modifications of the invention.

FIGS. 1–8

These figures illustrate a force transducer made from a generally cylindrical block 1 of elastic material having an axis 1a and including a central load carrying portion 2 with a convex upper surface 2a adapted to resist a compressive force P and a peripheral load carrying portion 3 encircling the central portion 2 and having an end surface 3a which is adapted to engage an underlying support capable of supplying a reactive force R distributed around the portion 3.

A first array of relatively large diameter holes 4, shown as four in number, extend through the block 1. The holes 4 are all of equal radius. Their axes, indicated at 4a, intersect a plane perpendicular to the block axis at the corners of a square. A second array of four holes, smaller in diameter than the holes 4, extends through the block 1 parallel to the axis of that block. The axes 5a of the holes 5 intersect the plane perpendicular to the block axis at the midpoints of the sides of the square defined by the axes 4a of the holes 4.

The two arrays of four holes each define four pairs of bridging portions 11,12; 13,14; 15,16; and 17,18; Note that the number of pairs of bridging portions is equal to the number of holes in each array. The several bridging portions connect the central load carrying portions to the peripheral load carrying portion 3. The bridging portions are stressed in shear when the load P is applied to the surface 2a and resisted by a reactive force R applied to the surface 3a. Obviously, the forces P and R may be reversed as to action and reaction effects.

Alternatively, the central load carrying portion 2 may be provided with a threaded aperture to receive a bolt so that an upwardly directed force may be applied to it.

The peripheral load carrying portion 3 is provided with four bolt holes 3b by which it may be attached to an underlying support, or through which a downward force may be applied.

Each pair of bridging portions namely 11,12; 13,14; 15,16; and 17,18, is stressed in shear by the compressive force P and the reactive force R. The forces may alternatively be tensile rather than compressive, with similar resulting shear stresses in all the bridging portions.

When an off-center load is applied to the force transducer, at least one pair of bridging portions is twisted by that load, and the stress due to the moment of the off-center load acts in opposite senses in the bridging portions of that pair or pairs, so that the effect of the off-center plurality of the load is minimized or completely eliminated. in block Inside each of the holes 4 and 5 on the surface thereof are mounted a plurality of strain sensitive electrical resistance elements identified as C1 to C8 and T1 to T8. Each strain sensitive element is illustrated as a continuous electrical resistance element extending back and forth so that it consists of a plurality of relatively long parallel reaches, each connected at each end by a relatively short connection to an adjacent reach. All of the parallel reaches lie in planes extending diagonally with respect to the axis of the block 1. The resistance elements C1 to C8 and T1 to T8 are applied to the bridging portions 11–18 at their narrowest sections, as shown in FIG. 1. Each of the elements C1 to C8 and T1 to T8 is connected at its ends to foil terminals, identified as 29 and 30 in the case of element C5 in FIG. 4. Alternatively, each strain sensitive element may be a semiconductor element, e.g., of the single filament crystal type.

Each of the strain sensitive electrical resistance elements C1 to C8 and T1 to T8 and the terminals 29 and 30 are bonded to their respective underlying surfaces by a suitable bonding agent, many of which are well-known in the art.

Figure 4:
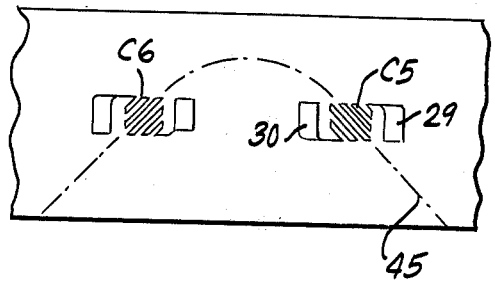
FIG. 4 is a developed elevational view taken on the line 4—4 of FIG. 1.
Figure 5:
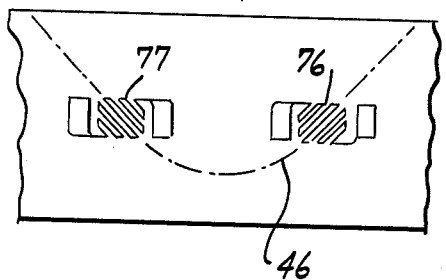

FIGS. 4, 5, 7 and 8 illustrate the relative orientation of the various resistance elements inside their respective holes. Note that each resistance element such as C5 and C6 in FIG. 4 is a continuous element including a plurality of relatively long parallel reaches. Each long reach is connected at each end by a relatively short connection to only one adjacent reach. All of the parallel reaches lie in planes extending diagonally with respect to the block axis. Traces of such planes are shown at 45, 46, 47 and 48 in the developed views of FIGS. 4, 5, 7 and 8. The parallel reaches of each resistance element, such as the elements C5 and C4, lie in planes which are substantially perpendicular to the parallel reaches of the strain sensitive element on the opposite surface of the bridge portion. For example, the element C5 is on the opposite side of the bridging portion 12 from the element T4, which is seen in developed view in FIG. 8. Although the conductors of element T4 appear to slant in the same direction in FIG. 8 as the conductors of C5 in FIG. 4, this is because the views are taken from the opposite sides of the bridging portion 12. Actually, these conductors T4 and C5 lie in planes which are mutually perpendicular.

Figure 6:
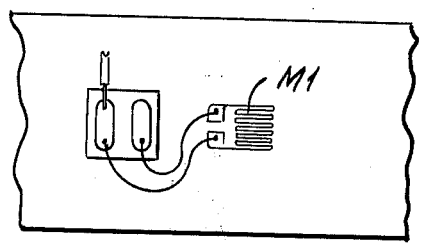
Figure 7:
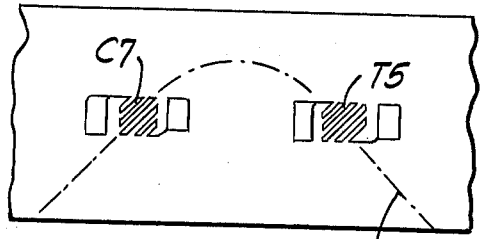
Figure 8:
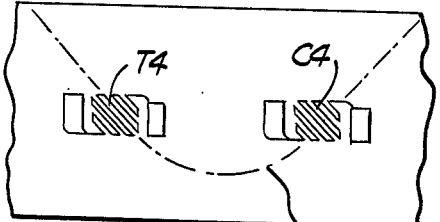

Two span temperature compensating resistance elements M1 and M2 are inserted in two of the holes 4 at their radially outermost points. As shown in FIG. 6, the grids of the resistance elements M1 and M2 have their conductors extending horizontally. By virtue of this horizontal conformation and because of the fact that these resistance elements are located at points which are substantially unstressed in shear, the resistance of the elements M1 and M2 do not vary significantly with changes in load. As shown in FIG. 9, the elements M1 and M2 are connected in series with input terminals 23 and 24 of the bridge circuit. They are made of suitable temperature responsive resistance material, i.e., a material having a substantial temperature coefficient of resistance. Their function is to compensate the bridge circuit for variation in Young's modulus of the material of the block 1. That modulus changes with temperature, for a given material, in accordance with a known characteristic. The elements M1 and M2 are chosen to compensate for such modulus variations.

FIG. 9

After the resistance elements C1 to C8, T1 to T8, M1 and M2 are connected by wires and the wires taken out through the aperture 20, as shown in the wiring diagram in FIG. 9, the holes 4 and 5 are enclosed by means of annular covers 23 and 24 (FIG. 3) which fit into annular recesses 25 and 26 respectively, that encircle the force receiving surface 2a. The wires connect the resistance elements in the spaces under the two covers 23 and 24.

After the covers 23 and 24 are in place, the interior of the force transducer is evacuated through a passage 27 which is thereafter sealed by a suitable block 28.

The bridge circuit 36 has the usual four arms, each consisting of two parallel branches, each branch having two resistance elements in series. Theoretically, a better averagng effect would be obtained if each branch consisted of one element located in one of the large holes 4 in series with one element located in one of the small holes 5. However, such an arrangement would require a larger number of longer connecting wires, which would not only crowd the space available between the block 1 and the covers 23, 24, but would also introduce effects due to the change in resistance of those wires with changes in temperature. The arrangement shown is preferred, wherein the wiring is simplified by connecting in series in a single branch any two T elements, or any two C elements, which are located in the same hole.

While the elements are labeled T and C, as is conventional in the art, it should be understood that the elements in this force transducer shown do not measure tensile or compressive strains, but rather shear strains. The designations T and C do not refer to tensile and compressive, but rather indicate opposite senses of response to loads applied to the surfaces 2a and 3a of the force transducer. All of the T elements are connected in two diagonally opposed arms of the bridge, and all of the C elements are connected in the other two diagonally opposed arms. Hence, even though the sense of response to a given load is opposite for the T elements as compared to the C elements, both responses unbalance the bridge 36 in the same sense, so that their effects are cumulative.

A balancing resistor 31, a zero balance temperature compensating resistor 32, calibrating resistors 33 and 34 and a shunt resistor 35 are located in junction box 22. These are all connected as shown in FIG. 9. It may be seen that the temperature compensating resistor 32 is in series with one arm of the bridge and the balancing resistor 31 is in series with another arm. Alternatively, resistors 31 and 32 may be interchanged or connected in the same arm, depending on the characteristics required of the transducer. The temperature compensating resistor 32 is selected to compensate the circuits for the effects of variations in temperature and resistance of the various elements C1 to C8 and T1 to T8. The balancing resistor 31 is selected at the time of manufacture to balance the bridge circuit under standard temperature conditions. The calibration resistors 33 and 34 are selected at the time of manufacture in order to make sure that the output signals of the transducer fall within specified characteristics. Shunt resistor 35 is selected at the time of manufacture, after the other resistors mentioned above have been selected, in order to make the input impedance of the bridge, as it appears to the power supply, conform to specified requirements.

One output terminal 30 of the bridge 36 is located inside the sealed force transducer box 38, while the output terminal 37 is located in the junction box 32. Terminals 30 and 37 are respectively connected to external input terminals 41 and 42. Input terminal 23 of the bridge 36 is connected through resistor M1 and resistor 33 to an external input terminal 43. Similarly, input terminal 24 of the bridge is connected through resistors M2 and 34 to external input terminal 44. These four external terminals 41–44 are located outside the junction box.

FIG. 10

This figure illustrates a modified form of force transducer constructed in accordance with the invention, in which a cylindrical block 51 is separated into a central load bearing portion 51a and a peripheral load bearing portion 51b by two arrays of four holes each, shown at 52 and 53, all of which are of the same diameter. Note that the holes 52 have their axes 52a at the corners of a square, while the holes 53 have their axes 53a at the midpoint of the sides of that square.

This modification is presented only to make clear that it is not necessary, in accordance with the broader aspects of the invention, for one array of holes to be larger than the other.

FIG. 11

This figure illustrates another modification in which a central load bearing portion 54a is separated from a peripheral load bearing portion 54b by two arrays of holes 55 and 56, with three holes in each array. The axes of the holes 55 intersect a plane perpendicular to the block axis at the corners of a triangle whose center is at the intersection of the block axis and that plane. The axes of the holes 56 intersect the plane at the midpoints of the sides of the triangle.

FIG. 12

This figure illustrates a further modification in which a block 61 has a central load carrying portion 61a separated from a peripheral load carrying portion 61b by two arrays of five holes each. The holes 62 have their axes intersecting a plane perpendicular to the block axis at the corners of a pentagon. The axes of the holes 53 intersect the plane at the midpoints of the sides of the pentagon.

Hence, it may be seen that, within the broader aspects of my invention, it is not necessary to use any particular number of holes in each of the two arrays, as long as there are at least three holes in each array. The diameters of the two arrays of holes are selected in accordance with the load carrying characteristics desired for the bridging portions, rather than any other criteria. It is commonly preferred to use an even number of holes in each array as in the species of FIG. 1, although odd numbers may be used, as shown in FIGS. 11 and 12.

I claim:
1. A force transducer, comprising:
   a. a cylindrical block of elastic material having a diameter greater than its axial length, said block having:
      1. two arrays of $n$ cylindrical holes, where $n$ is greater than two, each hole extending parallel to the axis of the cylindrical block and spaced therefrom, the axes of the holes in one of said arrays intersecting a plane perpendicular to the block axis at the corners of an $n$-sided polygon whose center is at the intersection of the block axis with said plane, the axes of the holes in the other array intersecting said plane at the midpoints of the sides of said $n$-sided polygon,
      2. said arrays of holes separating a central load carrying portion of said block, adapted at one end to oppose a force acting axially of the block, from a peripheral load carrying portion and adapted at the opposite end to oppose a second force acting axially in opposition to the first force, said holes defining the axially extending surfaces on $n$ pairs of parallel bridging portions extending between said central portion and said peripheral portion; and
   b. a plurality of strain sensitive elements, mounted on the surfaces of said bridging portions, inside the adjacent holes.

2. A force transducer as in claim 1, in which the two bridging portions of each pair are parallel to and equally spaced from a plane containing the axis of the cylindrical block.

3. A force transducer as in claim 2, in which the $n$ planes parallel to the $n$ pairs of bridging portions, are equally angularly spaced about the axis of the block.

4. A force transducer as in claim 1, in which two of said strain sensitive elements are mounted on each bridging portion on opposite surfaces thereof, so that two strain sensitive elements are located inside each hole.

5. A force transducer as in claim 4, in which each strain sensitive element is elongated and has the principal part of its length extending diagonally with respect to the block axis.

6. A force transducer as in claim 5, in which the strain sensitive element on one surface of each bridging portion has its parallel reaches lying in planes substantially perpendicular to the parallel reaches of the strain sensitive element on the opposite surface of the bridging portion.

7. A force transducer as in claim 4, including:
   a. a bridge circuit connecting said strain sensitive elements, said bridge circuit including two input terminals;
   b. two span temperature compensating resistance elements connected in series with the respective input terminals, said span temperature compensating resistance elements being mounted on the peripheral portion of the block inside two of said holes, and being effective to compensate the bridge circuit for variations in Young's modulus of the material of the block with changes in temperature.

8. A force transducer as in claim 7, in which each of said span temperature compensating resistance elements is a continuous electrical conductor including a plurality of relatively long parallel reaches, each connected at each end by a relatively short connection to one adjacent reach, all said reaches extending in planes substantially perpendicular to the block axis.

9. A force transducer as in claim 1, wherein the holes of said one array have a substantially greater diameter than the holes of said other array.

* * * * *

UNITED STATES PATENT OFFICE
CERTIFICATE OF CORRECTION

Patent No. 3,958,456               Dated May 25, 1976

Inventor(s) Walter E. Jacobson

It is certified that error appears in the above-identified patent and that said Letters Patent are hereby corrected as shown below:

Column 3, line 16, "plurality" should read

-- characteristic --;

line 17, "in block" should be deleted.

Signed and Sealed this

Thirty-first Day of August 1976

[SEAL]

Attest:

RUTH C. MASON
*Attesting Officer*

C. MARSHALL DANN
*Commissioner of Patents and Trademarks*